(12) United States Patent
Sung

(10) Patent No.: US 10,391,926 B2
(45) Date of Patent: Aug. 27, 2019

(54) LANE ADAPTIVE LAMP CONTROL APPARATUS AND METHOD

(71) Applicant: HYUNDAI MOBIS CO., LTD., Seoul (KR)

(72) Inventor: Jun Young Sung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/891,119

(22) Filed: Feb. 7, 2018

(65) Prior Publication Data

US 2018/0319315 A1 Nov. 8, 2018

(30) Foreign Application Priority Data

May 2, 2017 (KR) .................. 10-2017-0056458

(51) Int. Cl.
| | |
|---|---|
| B60Q 1/08 | (2006.01) |
| B60W 40/04 | (2006.01) |
| B60Q 1/14 | (2006.01) |

(52) U.S. Cl.
CPC ............ *B60Q 1/085* (2013.01); *B60Q 1/143* (2013.01); *B60W 40/04* (2013.01); *B60Q 2300/335* (2013.01); *B60W 2420/42* (2013.01); *B60W 2550/14* (2013.01)

(58) Field of Classification Search
None
See application file for complete search history.

(56) References Cited

U.S. PATENT DOCUMENTS

| | | | |
|---|---|---|---|
| 8,543,254 B1 * | 9/2013 | Schut | B60T 7/22 348/135 |
| 2012/0050074 A1 * | 3/2012 | Bechtel | B60R 1/04 340/988 |
| 2015/0124465 A1 * | 5/2015 | Lee | B60Q 1/085 362/465 |

FOREIGN PATENT DOCUMENTS

| | | |
|---|---|---|
| JP | 8-207656 A | 8/1996 |
| JP | 2005-53381 A | 3/2005 |
| JP | 2007-223382 A | 9/2007 |
| JP | 2010-95205 A | 4/2010 |
| KR | 10-2015-0134793 A | 12/2015 |

OTHER PUBLICATIONS

Office Action of corresponding Japanese Patent Application No. 2018-087344—3 pages (dated Feb. 26, 2019).

\* cited by examiner

*Primary Examiner* — Seokjin Kim
(74) *Attorney, Agent, or Firm* — Knobbe Martens Olson & Bear LLP

(57) ABSTRACT

Provided is a lane adaptive lamp control apparatus including a lane sensor configured to sense lane information of a road being traveled on, a lane determiner configured to determine information of a lane being traveled on from the lane information sensed through the lane sensor, and a lamp controller configured to control turning-on of a lamp according to the lane information determined by the lane determiner.

6 Claims, 3 Drawing Sheets

LANE ADAPTIVE LAMP CONTROL APPARATUS AND METHOD

CROSS-REFERENCE TO RELATED APPLICATION

This application claims priority to and the benefit of Korean Patent Application No. 2017-0056458, filed on May 2, 2017, the disclosure of which is incorporated herein by reference in its entirety.

BACKGROUND

1. Field of the Invention

The present disclosure relates to a lane adaptive lamp control apparatus and method, and more particularly, to a lane adaptive lamp control apparatus and method in which information on a lane being traveled on is identified and turning-on of a lamp is controlled according to the identified lane information so that glare given to an opposing vehicle and a preceding vehicle is prevented to ensure visibility of a driver.

2. Discussion of Related Art

General lamps in a vehicle are devices designed to ensure a view in a progress direction during nighttime driving. The vehicle lamps have undergone significant technological development.

Among vehicle lamps, intelligent lamps are equipped with functions regarding a driving condition and prevention of giving glare to opposing vehicles and preceding vehicles.

Such a conventional intelligent lamp includes a front camera, which is principal equipment that can recognize a front view, to use a function regarding prevention of giving glare to opposing vehicles and preceding vehicles. The front camera is used to control whether to turn off a lamp on the basis of a pair of light sources (headlights and taillights). That is, in the determining of whether to turn off the conventional intelligent lamp, lamp turning-off is controlled on the basis of a light source detected through camera image processing.

On a general highway, a median barrier is constructed to separate opposing vehicles, and most median barriers are partially open rather than being completely closed, and thus, during actual driving, light sources of opposing vehicle are exposed or blocked at a short period.

As the light sources are exposed in a section having a median barrier, misrecognition is caused in a conventional light source recognition-based adaptive lamp such that a lamp is frequently turned on and off.

In order to solve such a limitation of the conventional light source recognition-based adaptive lamp, a technology of receiving information about a road section having a median barrier from a navigation system, and turning off all left side-upward lamps in the corresponding road section has been applied to the adaptive lamp.

However, since a conventional intelligent lamp using navigation road information is informed only of the existence of a median barrier on a current road through road information of a navigation system and global positioning system (GPS) information, a lamp is consistently controlled independent of a lane on which a vehicle travels.

With control of a lamp being performed independent of a lane of a road, turning-off of left side-upward lamps may be of practical use when a vehicle travels on a first lane, but when the traveling vehicle is located on a second lane or a third lane, the turning-off of the left side-upward lamps may fail to ensure visibility with respect to left side lanes when traveling on an inner lane (the second lane or the third lane).

In particular, when entering a general highway, the conventional intelligent lamp may fail to ensure visibility of a left side lane in the course of preventing giving glare to an opposite party while merging into a right side lane, which may cause a fatal accident.

SUMMARY OF THE INVENTION

The present disclosure is directed to providing a lane adaptive lamp control apparatus and method capable of preventing lamp dazzle and misrecognition caused by a median barrier and improving visibility of a driver by varying a collective turning-off zone of lighting according to a lane being traveled on.

In addition, the present disclosure is directed to providing a lane adaptive lamp control apparatus and method capable of rapidly identifying a lane by receiving information about the number of one-way lanes from a navigation system and applying the received information to a determination of the lane information.

The technical objectives of the present disclosure are not limited to those disclosed above, and other objectives may become apparent to those of ordinary skill in the art on the basis of the following description.

One aspect of the present disclosure provides a lane adaptive lamp control apparatus including: a lane sensor configured to sense lane information of a road being traveled on; a lane determiner configured to determine information of a lane being traveled on from the lane information sensed through the lane sensor; and a lamp controller configured to control turning-on of a lamp according to the lane information determined by the lane determiner.

The lane sensor may be a camera configured to allow a lane to be identifiable.

The lane determiner may determine the lane information by using line type information from the lane information collected during traveling.

The lane determiner may receive information about the number of one-way lanes in connection with a navigation system, and apply the received information to a determination of a lane.

The lamp controller may control a turning-off zone of the lamp according to the lane information determined by the lane determiner.

Another aspect of the present disclosure provides a lane adaptive lamp control method including: collecting, by a control processor for controlling turning-on of an adaptive lamp, lane information of a road being traveled on through a sensing module; determining, by the control processor, information of a lane being traveled on from the collected lane information; and controlling, by the control processor, turning-on of the lamp according to the lane information determined in the determining of the lane information.

The collecting of the lane information may include collecting lane information through an image captured by a camera.

The determining of the lane information may include determining lane information by using line type information from lane information collected during traveling.

The determining of the lane information may include providing information about the number of one-way lanes from a navigation system in connection with the control processor.

The controlling of the lamp may include controlling a turning-off zone of the lamp according to the determined lane information.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The above and other advantages and a scheme for the advantages of the present disclosure will become readily apparent with reference to the following detailed description when considered in conjunction with the accompanying drawings. However, the scope of the present disclosure is not limited to such embodiments, and the present disclosure may be realized in various forms. The embodiments to be described below are provided so that the present disclosure may be thorough and complete and may fully convey the scope of the disclosure to those skilled in the art. The present disclosure is defined only by the scope of the appended claims. Meanwhile, the terms used herein are used to aid in the explanation and understanding of the present disclosure and are not intended to limit the scope spirit of the present disclosure.

It should be understood that the singular forms "a," "an," and "the" include plural references unless the context clearly dictates otherwise. The terms "comprises," "comprising," "includes," and/or "including," when used herein, specify the presence of components, steps, and/or operations, but do not preclude the presence or addition of one or more other components, steps, and/or operations.

Hereinafter, exemplary embodiments of the present disclosure will be described in detail with reference to the accompanying drawings.

Figure 1:
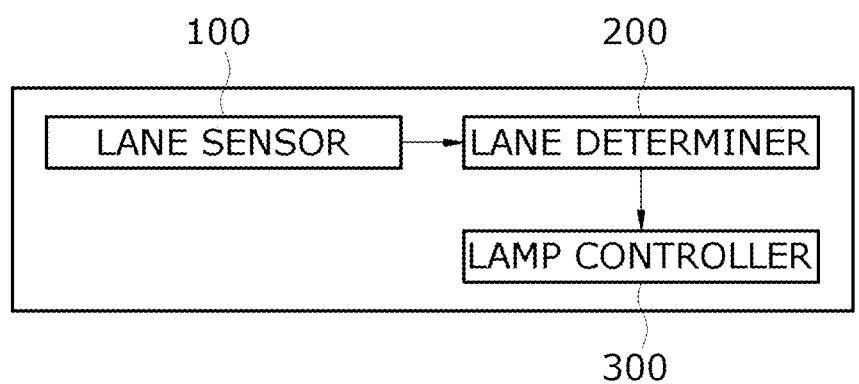
FIG. 1 is a functional block diagram for describing a lane adaptive lamp control apparatus according to an embodiment of the present disclosure.

FIG. 1 is a functional block diagram for describing a lane adaptive lamp control apparatus according to an embodiment of the present disclosure. Referring to FIG. 1, the lane adaptive lamp control apparatus according to the embodiment of the present disclosure includes a lane sensor 100, a lane determiner 200, and a lamp controller 300.

The lane sensor 100 serves to sense lane information of a road being traveled on. Preferably, the lane sensor 100 according to the embodiment of the present disclosure is provided using a camera capable of identifying a lane. The lane sensor 100 may employ a lane recognition technology which is applied to a conventional lane keeping assistance system (LKAS) or lane departure warning system (LDWS) for recognizing lanes such that the lane sensor 100 identifies a lane from a captured image.

The lane determiner 200 serves to determine information of a lane being traveled on from the lane information sensed through the lane sensor 100.

The lamp controller 300 serves to control turning-on of a lamp according to the lane information determined through the lane determiner 200. Preferably, a lamp used in the embodiment of the present disclosure may include a plurality of individually controllable light emitting diodes (LEDs) such that selective turning-on of the lamp is performed according to control of the lamp controller 300.

According to the embodiment of the present disclosure, information of a lane being traveled on is identified, and turning-on of the lamp is controlled to correspond to the identified lane information so that the lamp is prevented from being turned on or off according to misrecognition of opposing vehicles or road information and visibility of a driver is improved.

The lane determiner 200 according to the embodiment of the present disclosure determines lane information by using line type information about left and right side lines of a driving lane and next lines adjacent to the left and right side lines from the lane information sensed through the lane sensor 100. According to the embodiment of the present disclosure, the lane being traveled on is determined to be a highway at which a line type includes only a solid line and a dotted line, but the present disclosure is not limited thereto. Various line types may be used, such as a combination line and a double solid line.

Figure 2:
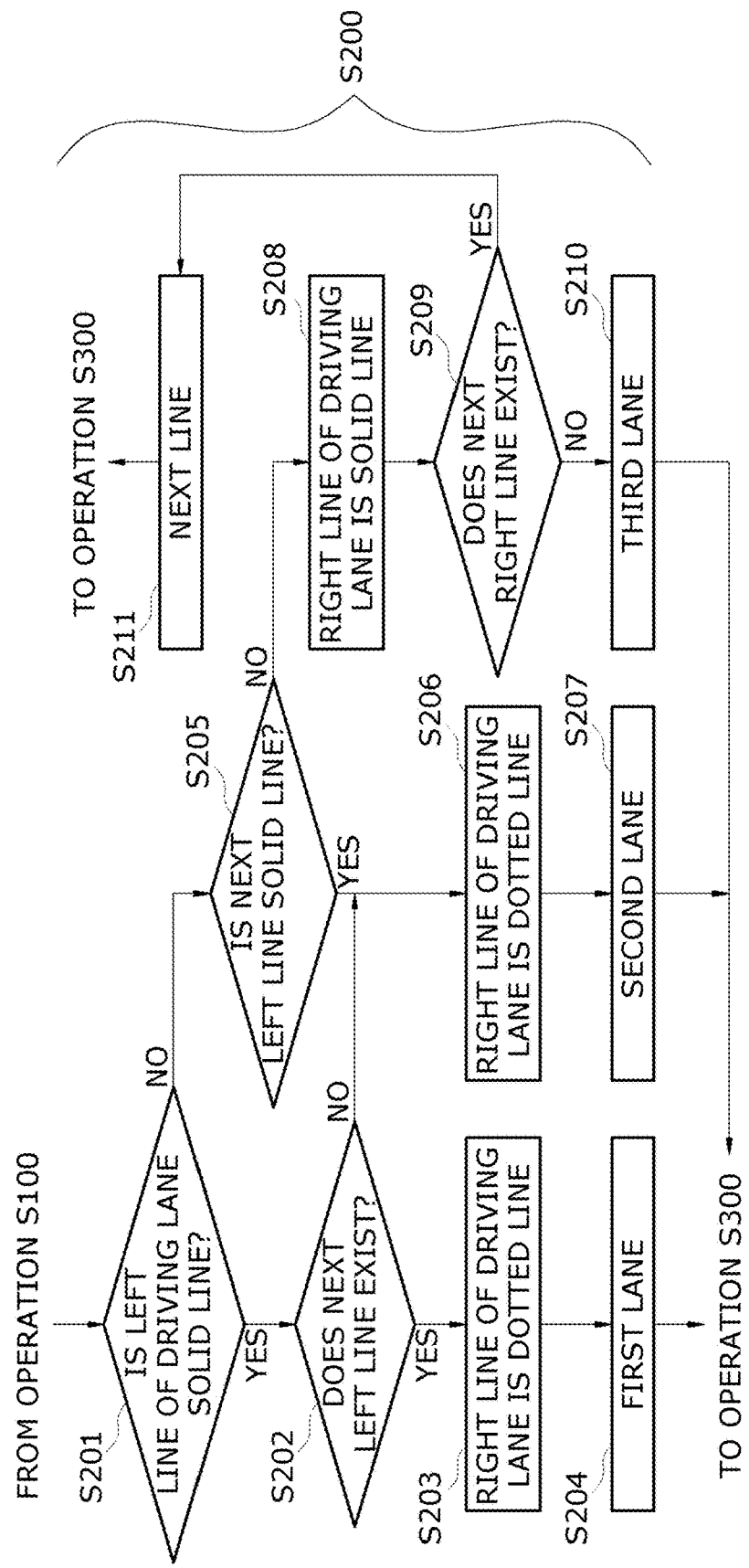
FIG. 2 is a flowchart for describing identification of a lane according to an embodiment of the present disclosure.

FIG. 2 is a flowchart for describing a process of the lane determiner 200 determining driving lane information by using lane information sensed on a three-lane highway including a solid line and a dotted line according to an embodiment of the present disclosure.

First, the lane determiner 200 determines whether a left line of a driving lane is a solid line (S201).

In this case, when the left line of the driving lane is a solid line (YES in S201), whether a next left line adjacent to the left line exists is determined (S202).

Then, when the next left line does not exist (NO in S202) and a right line of the driving lane is a dotted line (S203), the lane currently being traveled on is determined to be a first lane (S204), and when the next left line exists (YES in S202) and the right line of the driving lane is a dotted line (S206), the lane currently being traveled on is determined to be a second lane (S207).

Meanwhile, when the left line of the driving lane is not a solid line (NO in S201) but a dotted line, whether the next left line is a solid line is determined (S205). When the next left line is determined to be a solid line in operation S205 (YES in S205) and the right line of the driving lane is a dotted line (S206), the lane currently being traveled on is determined to be the second lane (S207).

Meanwhile, when the next left line is determined not to be a solid line (NO in S205) but a dotted line in the determination of whether the next left line is a solid line (S205) and the right line of the driving lane is a solid line (S208), whether a next right line adjacent to the right line exists is determined (S209).

When the next right line is determined not to exist in operation S209 (NO in S209), the lane currently being traveled on is determined to be the third lane (S210).

Meanwhile, when it is determined that the next right line exists in operation S209 (YES in S209), a process of determining a next lane is further included in the method (S211).

Although the embodiment of the present disclosure is illustrated in relation to the three-lane highway only including the solid line and the dotted line, the present disclosure is not limited to the number of lanes and may be applied to a highway having other types of lanes including a combination line, for example, a bus lane.

Meanwhile, the lane determiner 200 may receive information about the number of one-way lanes in connection with a navigation system, and use the received information to determine the lanes.

That is, when the lane determiner 200 does not receive information about the number of one-way lanes in connection with the navigation system, the lane determiner 200 needs to perform the determination of the existence of the next right line (S209) and the determination of the existence of the next lane (S211).

However, when the lane determiner 200 receives the information about the number of one-way lanes in connection with the navigation system, the lane determiner 200 may omit the determination of the existence of the next lane after the lane currently being traveled on is determined.

Meanwhile, the lamp controller 300 controls a turning-off zone 402, 404 or 406 of the lamp according to the lane information determined through the lane determiner 200.

Figure 4A:
Figure 4B:
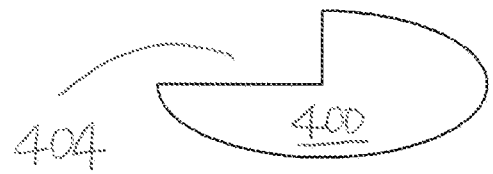
Figure 4C:
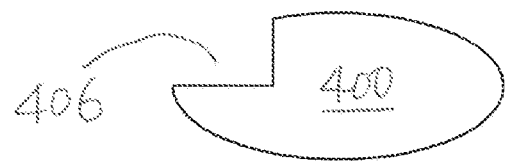

That is, when the lane currently being traveled on is determined to be the first lane by the lane determiner 200, the lamp controller 300 turns off a certain region 402 of an adaptive driving beam 400 (referred to as "ADB"), that is, turns off all of the left side-upward lamps, as shown in FIG. 4A, and when the lane currently being traveled on is determined to be the second lane, the lamp controller 300 turns on a certain area of the lamp corresponding to a single lane such that the single lane is illuminated, as shown in FIG. 4B, and when the lane currently being traveled on is determined to be the third lane, the lamp controller 300 turns on a certain area of the lamp corresponding to two lanes such that visibility for the two lanes is ensured, as shown in FIG. 4C.

Figure 3:
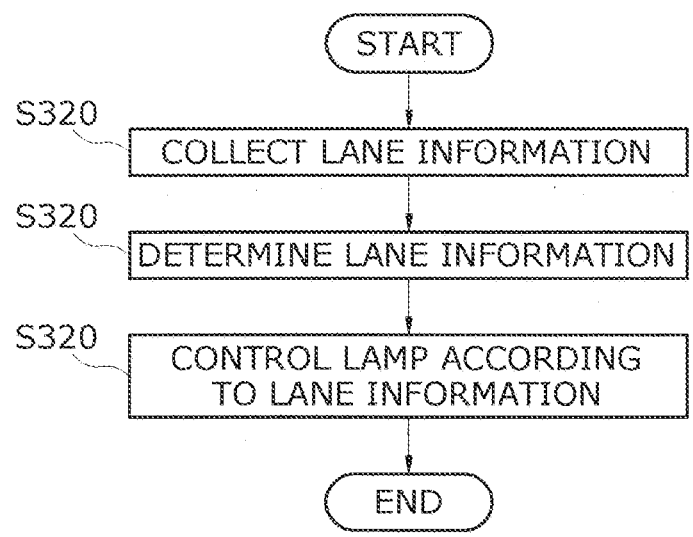
FIG. 3 is a flowchart for describing a lane adaptive lamp control method according to an embodiment of the present disclosure; and FIG. 4A to FIG. 4C is a view for describing a lamp turning-on control according to a lane in an embodiment of the present disclosure.

FIG. 3 is a flowchart for describing a lane adaptive lamp control method according to an embodiment of the present disclosure. Referring to FIG. 3, preferably, the lane adaptive lamp control method according to the embodiment of the present disclosure may be performed by a control processor for controlling turning on of an adaptive lamp.

First, lane information of a road being traveled on is collected through a sensor module (S100). Preferably, the collection of the lane information (S100) may be performed by collecting the lane information through an image captured by a camera. In this operation, in order to identify a lane from the captured image, a lane recognition technology applied to the conventional LKAS or LDWS may be used.

Then, information on a lane being traveled on is determined from the collected lane information (S200).

To this end, whether a left line of a driving lane is a solid line is determined from the collected lane information (S201).

In this case, when the left line of the driving lane is a solid line (YES in S201), whether a next left line adjacent to the left line exists is determined (S202).

When the next left line does not exist (NO in S202) and a right line of the driving lane is a dotted line (S203), the lane currently being traveled on is determined to be the first lane (S204), and when the next left line exists (YES in S202) and the right line of the driving lane is a dotted line (S206), the lane currently being traveled on is determined to be the second lane (S207).

Meanwhile, when the left line of the driving lane is not a solid line (NO in S201) but a dotted line, whether a next left line adjacent to the left line is a solid line is determined (S205). When it is determined that the next left line is a solid line in the operation S205 (YES in S205) and a right line of the driving lane is a dotted line (S206), the lane currently being traveled on is determined to be the second lane (S207).

However, when the next left line is determined not to be a solid line (NO in S205) but to be a dotted line in the determination of whether the next left line is a solid line (S205) and the right line of the driving lane is a solid line (S208), whether a next right line adjacent to the right line exists is determined (S209).

Then, a turning-on of a lamp is controlled according to the lane information determined in operation S300. That is, preferably, the control of the turning-on of the lamp (S300) may be performed by controlling a turning-off zone of the lamp according to the determined lane information. That is, when the lane currently being traveled on is determined to be the first lane by the lane determiner 200, the lamp controller 300 turns offs a certain region of an ADB, that is, turns off all of left side-upward lamps, as shown in FIG. 4A, and when the lane currently being traveled on is determined to be the second lane, the lamp controller 300 turns on a certain area of the lamp corresponding to a single lane such that the single lane is illuminated, as shown in FIG. 4B, and when the lane currently being traveled on is determined to be the third lane, the lamp controller 300 turns on a certain area of the lamp corresponding to two lanes such that visibility for the two lanes is ensured, as shown in FIG. 4C.

Preferably, the determination of the lane information (S200) may be performed by determining the lane by using line type information from the lane information collected during driving. According to the embodiment of the present disclosure, the line type is determined to be only the solid line or dotted line, but the present disclosure is not limited thereto. Various line types such as a combination line and a double solid line may be used.

Meanwhile, the determination of the lane information (S200) may include receiving information about the number of one-way lanes in connection with a navigation system. Without receiving information about the number of one-way lanes in connection with the navigation system, the determination of the lane information (S200) requires the determination of the existence of the next right line (S209) and the determination of the existence of the next lane (S211). However, when the information about the number of one-way lanes which is provided in connection with the navigation system is applied to the operation of determining the lane information, the operation of determining the existence of the next lane is omitted after the lane currently being traveled on is determined.

As is apparent from the above, dazzle of turning on and off of a lamp occurring due to a median barrier can be prevented and visibility of a driver can be improved by varying a turning-off zone according to a location of a lane.

In addition, a lane can be rapidly identified by applying the number of one-way lanes provided by a navigation system to a determination of the lane.

The above description of the disclosure is for illustrative purposes, and a person having ordinary skilled in the art should appreciate that other specific modifications may be easily made without departing from the technical spirit or essential features of the disclosure. Therefore, the exemplary embodiments disclosed in the present disclosure and the accompanying drawings are intended to illustrate and not limit the technical spirit of the present disclosure, and the scope of the present disclosure is not defined by the detailed description as set forth above but by the accompanying claims of the disclosure.

What is claimed is:

1. A lane adaptive lamp control apparatus for a vehicle, the apparatus comprising:
   a lane sensor configured to sense lane information of a road on which the vehicle is traveling, the road comprising a first lane, a second lane and a third lane, the first lane being immediately next to a center dividing line of the road, the second lane being immediately next to the first lane to the right, the third lane being immediately next to the second lane to the right;
   a lane determiner configured to determine which lane of the road the vehicle is traveling among the first lane, the second lane and the third lane of the road using the lane information sensed through the lane sensor; and
   a lamp controller configured to control a headlamp of the vehicle based upon which lane of the road the vehicle is traveling such that:
      when determined that the vehicle is traveling on the first lane, the headlamp turns off a first turning-off zone of a light beam from the headlamp,
      when determined that the vehicle is traveling on the second lane, the headlamp turns off a second turning-off zone of the light beam from the headlamp, and
      when determined that the vehicle is traveling on the third lane, the headlamp turns off a third turning-off zone of the light beam from the headlamp,
   wherein the first, second and third turning-off zones of the light beam are located at an upper left corner of the light beam, wherein the first turning-off zone is greater than and encompasses the second turning-off zone, wherein the second turning-off zone is greater than and encompasses the third turning-off zone.

2. The lane adaptive lamp control apparatus of claim 1, wherein the lane sensor is a camera.

3. The lane adaptive lamp control apparatus of claim 1, wherein the lamp controller is configured to receive information about the number of one-way lanes in connection with a navigation system, and further configured to apply the received information to determine which lane of the road the vehicle is traveling.

4. A method of controlling a headlamp of a vehicle, the method comprising:
   collecting, by a control processor for controlling turning-on of the headlamp, lane information of a road on which the vehicle is traveling, the road comprising a first lane, a second lane and a third lane, the first lane being immediately next to a center dividing line of the road, the second lane being immediately next to the first lane to the right, the third lane being immediately next to the second lane to the right;
   determining, by the control processor, which lane of the road the vehicle is traveling among the first lane, the second lane and the third lane using the lane information; and
   controlling, by the control processor, a headlamp of the vehicle upon which lane of the road the vehicle is traveling such that:
      when determined that the vehicle is traveling on the first lane, the headlamp turns off a first turning-off zone of a light beam from the headlamp,
      when determined that the vehicle is traveling on the second lane, the headlamp turns off a second turning-off zone of the light beam from the headlamp, and
      when determined that the vehicle is traveling on the third lane, the headlamp turns off a third turning-off zone of the light beam from the headlamp,
   wherein the first, second and third turning-off zones of the light beam are located at an upper left corner of the light beam, wherein the first turning-off zone is greater than and encompasses the second turning-off zone, wherein the second turning-off zone is greater than and encompasses the third turning-off zone.

5. The method of claim 4, wherein the collecting of the lane information includes collecting lane information through an image captured by a camera.

6. The method of claim 4, wherein the determining of the lane information includes providing information about the number of one-way lanes from a navigation system in connection with the control processor.

* * * * *